United States Patent
Bates et al.

(10) Patent No.: US 8,219,830 B2
(45) Date of Patent: Jul. 10, 2012

(54) APPARATUS AND METHOD FOR MANAGEMENT FOR FILE AGGREGATES AND FILE DIRECTORIES

(75) Inventors: Allen Keith Bates, Tucson, AZ (US); Nils Haustein, Mainz (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 12/505,448

(22) Filed: Jul. 17, 2009

(65) Prior Publication Data
US 2011/0016331 A1    Jan. 20, 2011

(51) Int. Cl.
*H04L 9/32* (2006.01)
*H04L 9/00* (2006.01)
*G06F 7/04* (2006.01)

(52) U.S. Cl. ........ 713/193; 713/189; 713/190; 713/191; 713/192; 713/194; 726/27; 726/28; 726/29; 726/30

(58) Field of Classification Search .................... 713/193
See application file for complete search history.

(56) References Cited

U.S. PATENT DOCUMENTS

| | | | |
|---|---|---|---|
| 6,480,851 B1 | 11/2002 | Terek | |
| 6,751,625 B2 * | 6/2004 | Ohgake | 1/1 |
| 2006/0174003 A1 | 8/2006 | Wilson et al. | |
| 2008/0005802 A1 | 1/2008 | Fierstein et al. | |
| 2008/0065903 A1 | 3/2008 | Goodman et al. | |

* cited by examiner

*Primary Examiner* — Longbit Chai
(74) *Attorney, Agent, or Firm* — Dale F. Regelman; Quarles & Brady LLP

(57) ABSTRACT

A method for accessing data in a data storage system is presented. The method includes supplying a host computer that is in communication with the data storage system, where the data storage system includes a data storage medium and a holographic data storage medium. A first request is generated to access a directory encoded in the data storage medium and includes a first encryption key. The requested directory recites a listing of data files encoded in the holographic storage medium. If the first encryption key decrypts the directory, the directory is read and a data file encoded in the holographic data storage medium is identified. A second request is then generated to access the data file and includes a second encryption key. Finally, if the second encryption key decrypts the data file, then it is read.

19 Claims, 2 Drawing Sheets

APPARATUS AND METHOD FOR MANAGEMENT FOR FILE AGGREGATES AND FILE DIRECTORIES

FIELD OF THE INVENTION

The invention is directed to an apparatus and method for management of file aggregates and file directories stored in an intermediate storage assembly prior to destaging those file directories and/or file directories to a data storage library.

BACKGROUND OF THE INVENTION

The present invention relates generally to holographic data storage medium, and more particularly to accessing encrypted data files.

In holographic information storage, an entire page of information is stored at once as an optical interference pattern within a thick, photosensitive optical material. This is done by intersecting two coherent laser beams within the storage material. The first, called the data beam or signal beam, contains the information to be stored; the second, called the reference beam, is designed to be simple to reproduce—for example, a simple collimated beam with a planar wave front.

The resulting optical interference pattern of the two coherent laser beams causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

SUMMARY OF THE INVENTION

In one implementation, a method to manage file aggregates and file directories is presented. The method generates a plurality of data files by a host computer, forms (N) file aggregates, wherein each file aggregate comprises one or more of the plurality of data files, and wherein (N) is greater than or equal to 2, and forms (N) directories, wherein each directory is associated with a different one of the (N) file aggregates. The method then encrypts the (N) file aggregates using a first encryption key, encrypts the (N) directories using a second encryption key, wherein the first encryption key differs from the second encryption key, and encodes the (N) encrypted file aggregates and the (N) directories in a data storage medium.

In another implementation, an intermediate storage assembly is presented that comprises a storage controller and a computer readable medium that includes computer readable program code to manage file aggregates and file directories where the intermediate storage assembly is in communication with a host computer. The computer readable code includes a series of computer readable program steps to effect receiving (N) file aggregates, wherein each file aggregate comprises one or more of a plurality of data files, and wherein (N) is greater than or equal to 2, and forming (N) directories, wherein each directory is associated with a different one of the (N) file aggregates. The computer readable code further includes a series of computer readable program steps to effect encrypting the (N) file aggregates using a first encryption key, encrypting the (N) directories using a second encryption key, wherein the first encryption key differs from the second encryption key, and encoding the (N) encrypted file aggregates and the (N) directories in a data storage medium.

In yet another implementation, a data storage library is presented that comprises a computer readable medium that includes computer readable program code to manage file aggregates and file directories where the data storage library is in communication with an intermediate storage assembly that is in communication with a host computer. The computer readable code includes a series of computer readable program steps to effect receiving a file aggregate, and a directory. The computer readable code further includes a series of computer readable program steps to effect encrypting the file aggregates using a first encryption key, encrypting the directory using a second encryption key, wherein the first encryption key differs from the second encryption key, and encoding the encrypted file aggregate and the encrypted directory in a data storage medium.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
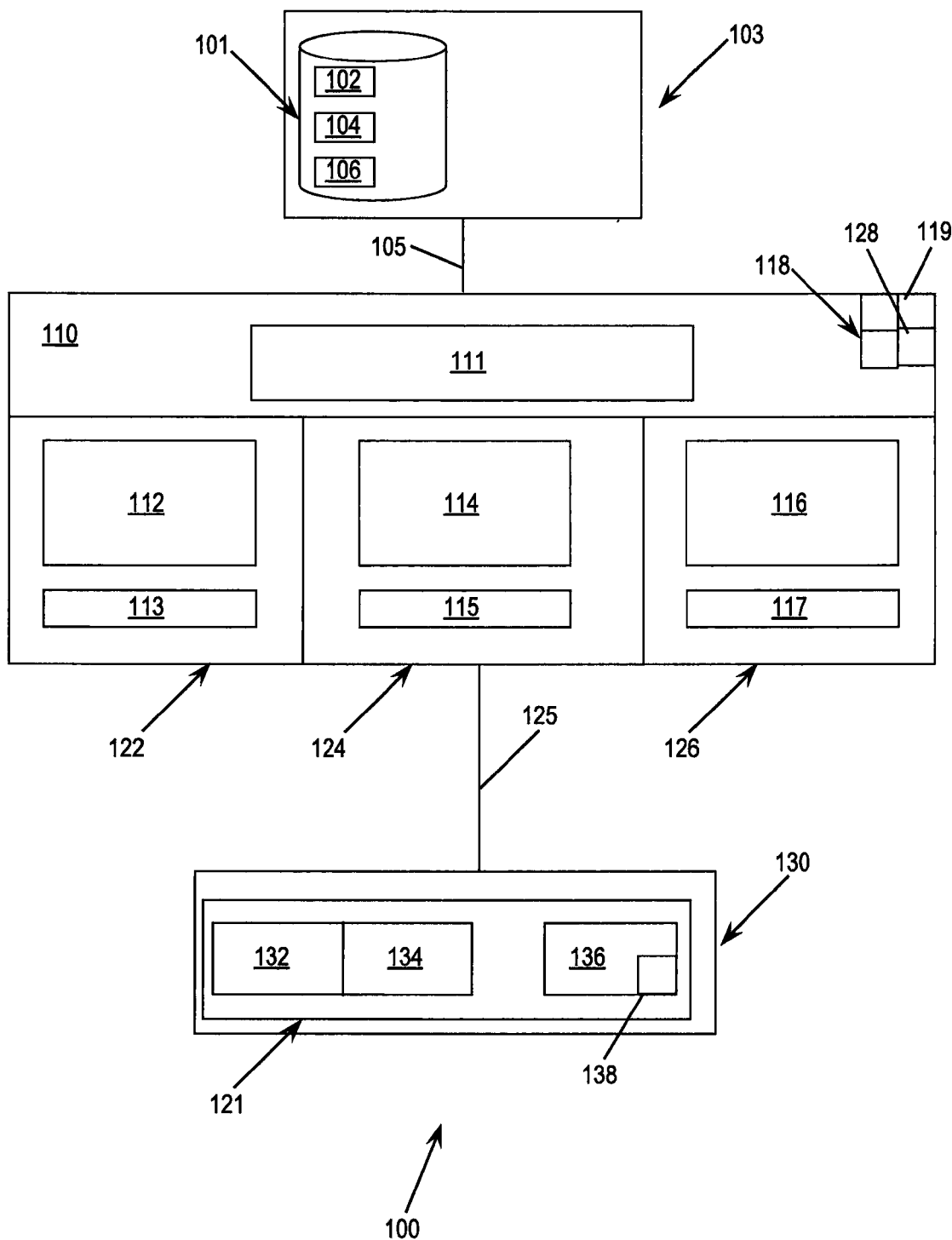
FIG. 1 illustrates an exemplary embodiment of a holographic data storage and retrieval system wherein Applicants' invention may be employed.

FIG. 1 illustrates an embodiment of a data destaging system 100 for data storage wherein Applicants' invention may be employed. Data destaging system 100 efficiently transfers data, for example, from a computer readable medium 101 disposed in host computer 103, through intermediate data storage assembly 110, and finally to data storage library 130 which comprises computer readable medium 121.

In the illustrated embodiment of FIG. 1, intermediate data storage assembly 110 comprises partitions 122, 124, and 126. In certain embodiments, partitions 122, 124, and 126, each comprise a different computer readable medium. By "computer readable medium," Applicants' mean a data storage medium in combination with the hardware, software, and/or firmware, to encode information in the data storage medium, and/or decode information from the data storage medium. In certain embodiments, the data storage medium comprises a magnetic data storage medium. In certain embodiments, the data storage medium comprises an optical data storage medium. In certain embodiments, the data storage medium comprises a holographic data storage medium. In certain embodiments, the data storage medium comprises an electronic data storage medium.

In certain embodiments, partitions 122, 124, and 126, each comprise a different logical unit ("LUN") configured in one or more physical computer readable media.

In the illustrated embodiment of FIG. 1, intermediate data storage assembly 110 further comprises a storage controller 111 in communication with computer readable medium 118. In certain embodiments, computer readable program code 119 is encoded in computer readable medium 118. In other embodiments, computer readable medium 118 includes local memory employed during actual execution of the computer readable program code. In other embodiments, computer readable medium 118 includes bulk storage. In yet other embodiments computer readable medium 118 includes cache memories, which provide temporary storage of at least some program code in order to reduce the number of times code must be retrieved from bulk storage during execution.

In certain embodiments, intermediate data storage assembly 110 is integral with data storage library 130. In certain embodiments, intermediate data storage assembly 110 is integral with host 103. In certain embodiments, intermediate data storage assembly 110 is external to both host 103 and data storage library 130. In certain embodiments, intermediate data storage assembly 110 communicates with host 103 via communication link 105. In certain embodiments, intermediate data storage assembly 110 communicates with data storage library 130 via communication link 125. In certain embodiments, communication links 105 and 125 are each independently selected from the group consisting of SCSI, iSCSI, Fibre Channel, Ethernet, Fibre Channel over Ethernet, Infiniband, and the like.

Data is provided by host 103 to a partition 122, 124, or 126, configured in intermediate data storage assembly 110 for subsequent storage in data storage library 130. In certain embodiments, host 103 writes data to intermediate data storage assembly 110 using, for example a "destage virtual track" operation. In certain embodiments, such a "destage virtual track" operation comprises a SCSI (Small Computer System Interface) write command, an iSCSI (Internet Small Computer System Interface) command, a GbEN (Global Built Environment Network) command, or the like. In certain embodiments, communication link 105 comprises a network, such as a Storage Area Network.

In certain embodiments, each partition 122, 124, and 126, stores data for a different designation application. By way of example and not limitation, partition 122 may be used to encode word processor data files, partition 124 may be used to encode spreadsheet data files, and partition 126 may be used to encode presentation data files. In certain embodiments, each partition 122, 124, and/or 126, is used by a different user. By way of example and not limitation, user A may encode data in partition 122, user B may encode data in partition 124, and user C may encode data in partition 126.

In certain embodiments, data is encoded holographically in partitions 122, 124, and 126. Applicants have found that aggregation of multiple holographically encoded data files to form the file aggregates 112, 114, and 116, results in a more efficient use of system resources and holographic data storage media resources when the files are subsequently destaged to a holographic data storage medium 121 disposed in data storage library 130. By "destaging" a file aggregate or a directory stored at a first storage address, Applicants mean copying the file aggregate or directory to a second storage address and replacing the file aggregate or directory at the first storage address with a stub indicating the second storage address.

In certain embodiments, host 103 sets one or more parameters used for such aggregation. In certain embodiments, files are aggregated on the basis of similar transactions, such as credit card transactions. In other embodiments, files are aggregated based on the user or set of users of the data.

In certain of these holographic data storage embodiments, each of partitions 122, 124, and 126, encoded a plurality of holograms to form file aggregates 112, 114, and 116, respectively. In certain embodiments, each of such a plurality of holograms mirrors a file holographically encoded in storage portion 132 of holographic data storage medium 121.

Storage controller 114 manages file aggregates 112, 114, and 116. If a file aggregate is available to encode additional file, storage controller 114 designates that file aggregate as "open." If a file aggregate is not available to encode additional file, storage controller 114 designates that file aggregate as "closed."

Storage controller 111 maintains directories 113, 115, and 117, wherein those directories are associated with file aggregates 112, 114, and 116, respectively. Each open directory comprises a listing of the files holographically encoded in an associated file aggregate. When a file aggregate is closed and destaged to data storage library 130, the associated directory is replicated and embedded within that closed file aggregate. In addition, the directory is replicated and encoded in storage medium 101 disposed in host computer 103. For example, when file aggregate 112 is closed and destaged to data storage library 130, directory 113 will be encoded as directory 102 in data storage medium 101. Similarly, when file aggregates 114 and 116 are closed and destaged to data storage library 130, directories 115 and 117 will be encoded as directories 104 and 106, respectively, in data storage medium 101.

Encoded directories 102, 104, and 106, allow different users to determine the files each has stored in data storage library 130. In other embodiments where data destaging system 100 includes multiple hosts, encoded directories 102, 104, and 106, allow each host to know the files each has stored in data storage library 130. In certain embodiments, media directory 134 comprises a copy of each encoded directory 102, 104, and 106, wherein media directory 134 is encoded in the holographic data storage medium 121. Media directory 134 comprises information necessary for data storage library 130 to determines the proper storage addresses for closed file aggregates 112, 114, and 116, when encoding those closed file aggregates in storage portion 132 of holographic data storage medium 121. In certain embodiments, holographic data storage medium 121 is removably disposed in data storage library 130.

Storage controller 114 manages the destaging of file aggregates 112, 114, and 116, to data storage library 130. In certain embodiments, storage controller destages file aggregates based upon a policy 128. By way of example and not limitation, in certain embodiments, policy 128 relates to whether a physical data storage medium is full, a time threshold has been reached, or whether a threshold number of file aggregates are "open."

In certain embodiments, data storage library 130 comprises data storage media other than holographic data storage medium 121. In certain embodiments, data storage library 130 comprises a magneto-optical disk. In other embodiments, data storage library 130 comprises a phase-change disk. In yet other embodiments, data storage library 130 comprises a magnetic tape. In still other embodiments, data storage library 130 comprises a millipede cartridge, DVD disk, Blu-Ray disk, or solid-state drive.

In certain embodiments, file aggregates 112, 114, and 116, are encrypted when destaged to data storage library 130, to storage portion 132 of holographic data storage medium 121. In certain embodiments, file aggregates 112, 114, and 116, are encrypted using the same encryption key. In certain embodiments, file aggregates 112, 114, and 116, are each encrypted using a different encryption key. In certain embodiments, only portions of file aggregates 112, 114, and 116 are encrypted. In certain embodiments, data is encrypted as that data is associated with a file aggregate 112, 114, or 116.

In certain embodiments, directories 113, 115, and 117, are encrypted when destaged to, and encoded in, data storage library 130. In such embodiments, media directory 132 is also similarly encrypted, i.e. encrypted using the same encryption key. In certain embodiments, directories 113, 115, and 117, are encrypted when destaged to, and encoded in, host disk 101 as directories 102, 104, and 106, respectively.

In certain embodiments, directories 113, 115, and 117, are encrypted using the same encryption key. In certain embodiments, this encryption key is the same as that used to encrypt file aggregates 112, 114, and 116. In certain embodiments, directories 113, 115, and 117, are each encrypted using a first encryption key. In certain embodiments, file aggregates 112, 114, and 116, are each encrypted using a second encryption key, wherein the second encryption key differs from the first encryption key. In certain embodiments, directories 113, 115, and 117, are encrypted using a second encryption key. In certain embodiments, directories 113, 115, and 117, are each encrypted using a different encryption key. In certain embodiments, the encryption key used to encrypt directory 113 is the same as that used to encrypt file aggregate 112. In certain embodiments, the encryption key used to encrypt directory 115 is the same as that used to encrypt file aggregate 114. In certain embodiments, the encryption key used to encrypt directory 117 is the same as that used to encrypt file aggregate 116.

Figure 2:
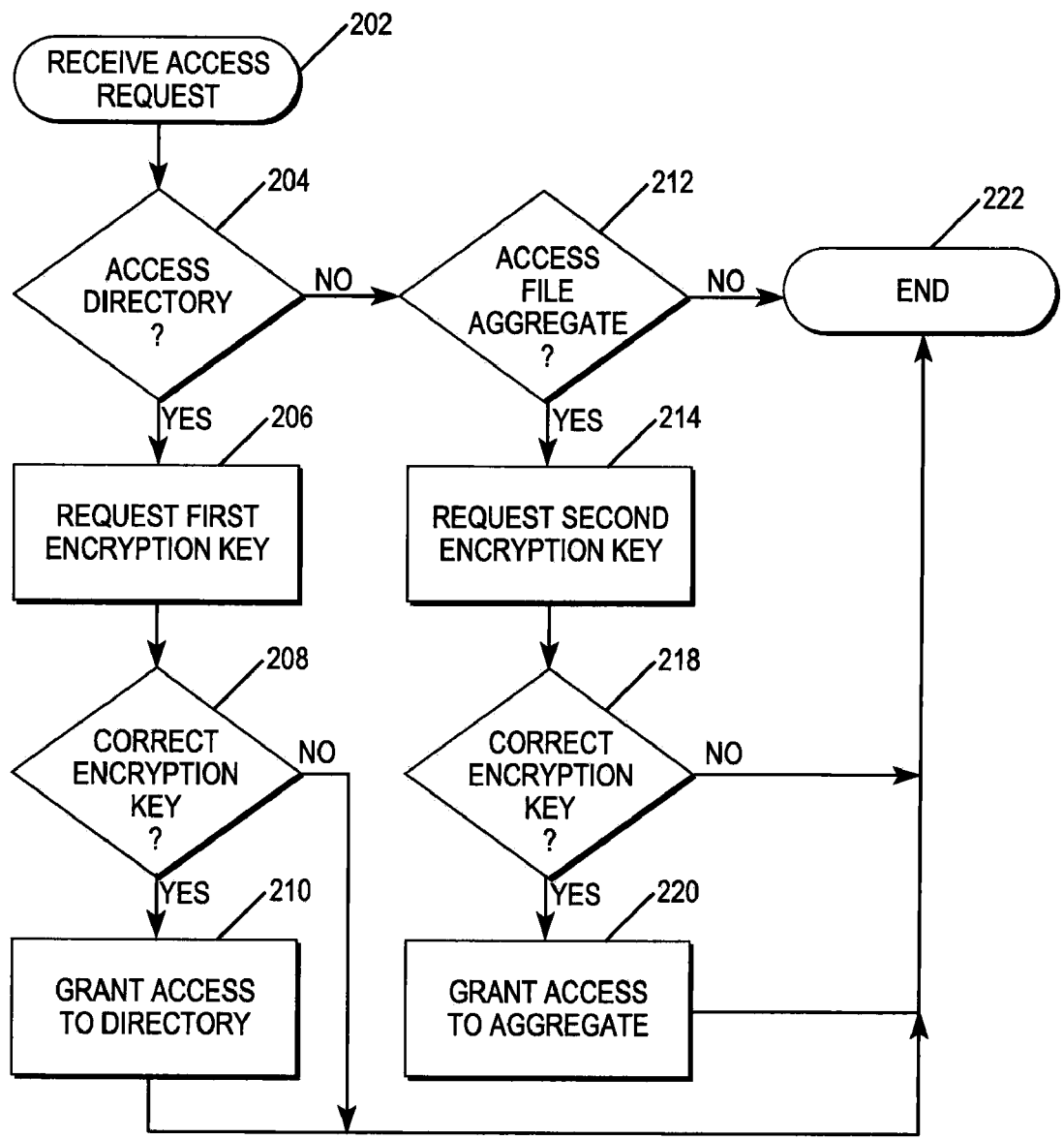
FIG. 2 illustrates an exemplary embodiment of an access process which can be used with a holographic data storage and retrieval system, such as depicted in FIG. 1.

FIG. 2 summarizes Applicants' method to grant access to one or more directories stored in Applicants' intermediate storage, and/or to grant access to one or more data aggregates stored in intermediate data storage assembly 110. In the method summarized in FIG. 2, the data aggregates 112, 114, 116 have been encrypted using a first encryption key and the directories 113, 115, 117 have been encrypted using a second encryption key, wherein the first encryption key differs from the second encryption key.

Referring now to FIG. 2, in step 202 intermediate data storage assembly 110 receives a request for access. In certain embodiments, the access request is provided by a host computer, such as host computer 103 (FIG. 1). In certain embodiments, the request is sent from at least one of a plurality of host computers in communication with intermediate data storage assembly 110.

In step 204, the method determines if the request of step 202 comprises a request for access to a directory, such as and without limitation one of directories 113, 115, or 117. In certain embodiments, step 204 is performed by intermediate data storage assembly 110. In certain embodiments, step 204 is performed by a host computer in communication with intermediate data storage assembly 110.

If the method determines in step 204 that the request of step 202 comprises a request for access to a directory, then the method transitions from step 204 to step 206 wherein the method requests a first encryption key. In certain embodiments, step 206 is performed by a host computer, such as host computer 103 (FIG. 1). In certain embodiments, step 206 is performed by Applicants' intermediate data storage assembly 110 (FIG. 1).

In step 208, the method determines if the requester of step 202 has provided a correct first encryption key. In certain embodiments, step 208 is performed by a host computer, such as host computer 103 (FIG. 1). In certain embodiments, step 208 is performed by Applicants' intermediate data storage assembly 110 (FIG. 1).

If the method determines in step 208 that the requester of step 202 has provided a correct first encryption key, then the method transitions from step 208 to step 210 wherein the method allows access to the directory requested in step 202. In certain embodiments, step 210 is performed by a host computer, such as host computer 103 (FIG. 1). In certain embodiments, step 210 is performed by Applicants' intermediate data storage assembly 110 (FIG. 1). Alternatively, the method determines in step 208 that the requestor of step 202 has not provided a correct first encryption key, then the method transitions from step 208 to step 222 and ends.

If the method determines in step 204 that the request of step 202 does not comprises a request for access to a directory, then the method transitions from step 204 to step 212 wherein the method determines if the request of step 202 comprises a request for access to a data aggregate, such as and without limitation one of data aggregates 112 (FIG. 1), 114 (FIG. 1), or 116 (FIG. 1). In certain embodiments, step 212 is performed by a host computer, such as host computer 103 (FIG. 1). In certain embodiments, step 212 is performed by Applicants' intermediate data storage assembly 110 (FIG. 1).

If the method determines in step 212 that the request of step 202 does not comprises a request for access to a data aggregate, then the method transitions from step 212 to step 222 and ends. In certain embodiments, step 222 is performed by a host computer, such as host computer 103 (FIG. 1). In certain embodiments, step 222 is performed by Applicants' intermediate data storage assembly 110 (FIG. 1).

If the method determines in step 212 that the request of step 202 comprises a request for access to a data aggregate, then the method transitions from step 212 to step 214 wherein the method requests a second encryption key. In certain embodiments, step 214 is performed by a host computer, such as host computer 103 (FIG. 1). In certain embodiments, step 214 is performed by Applicants' intermediate data storage assembly 110 (FIG. 1).

In step 218, the method determines if the requester of step 202 has provided a correct second encryption key. In certain embodiments, step 218 is performed by a host computer, such as host computer 103 (FIG. 1). In certain embodiments, step 218 is performed by Applicants' intermediate data storage assembly 110 (FIG. 1).

If the method determines in step 218 that the requestor of step 202 has provided a correct second encryption key, then the method transitions from step 218 to step 220 wherein the method allows access to the data aggregate requested in step 202. In certain embodiments, step 220 is performed by a host computer, such as host computer 103 (FIG. 1). In certain embodiments, step 220 is performed by Applicants' intermediate data storage assembly 110 (FIG. 1). Alternatively, the method determines in step 218 that the requestor of step 202 has not provided a correct second encryption key, then the method transitions from step 218 to step 222 and ends.

In certain embodiments, individual steps recited in FIG. 2 and described hereinabove may be combined, eliminated, or reordered.

In certain embodiments, computer readable program code, such as instructions 119 (FIG. 1) and/or computer readable program code 138 (FIG. 1), are encoded in computer readable medium, such as computer readable medium 118 (FIG. 1) and/or computer readable medium 136 (FIG. 1), wherein those instructions are executed by a processor disposed in storage controller 114 (FIG. 1) and/or a processor disposed in data storage library 130 (FIG. 1), to perform one or more of the steps 202, 204, 206, 208, 210, 212, 214, 218, 220, and 222 recited in FIG. 2.

In yet other embodiments, the invention includes computer readable program code residing in any other computer program product, where that computer readable program code is executed by a computer external to, or internal to, system 100 (FIG. 1) to perform one or more of the steps 202, 204, 206, 208, 210, 212, 214, 218, 220, and 222 recited in FIG. 2. In either case the computer readable program code may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present inventions.

What is claimed is:

1. A method to manage file aggregates and file directories, comprising:
generating a plurality of data files by a host computer;
forming (N) file aggregates, wherein each file aggregate comprises one or more of said plurality of data files, and wherein (N) is greater than or equal to 2;
forming (N) directories, wherein each directory is associated with a different one of said (N) file aggregates;
encrypting said (N) file aggregates using a first encryption key;
encrypting said (N) directories using a second encryption key, wherein said first encryption key differs from said second encryption key;
encoding said (N) encrypted file aggregates and said (N) directories in a first data storage medium.

2. The method of claim 1, further comprising:
providing an intermediate storage assembly comprising a storage controller and in communication with said host computer;
wherein:
said first data storage medium is disposed in said intermediate storage assembly;
said encrypting is performed by said storage controller.

3. The method of claim 2, wherein said first data storage medium comprises a holographic data storage medium.

4. The method of claim 3, further comprising:
supplying a data storage library comprising a second data storage medium and in communication with said by said storage controller;
prior to said encrypting steps, destaging an (i)th file aggregate and an (i)th directory from said intermediate storage assembly to said data storage library;
wherein said (i)th file aggregate and said (i)th directory are encoded in said second data storage medium.

5. The method of claim 4, wherein said second data storage medium comprises a holographic data storage medium.

6. The method of claim 4, further comprising:
encrypting by said data storage library said (i)th file aggregate using said first encryption key;
encrypting by said data storage library said (i)th directory using said second encryption key, wherein said first encryption key differs from said second encryption key.

7. The method of claim 6, further comprising:
receiving a request for access;
operative if said request comprises a request for access to said (i)th file aggregate, requesting said first encryption key from a requestor;
operative if said requestor provides said first encryption key, granting access to said (i)th file aggregate;
operative if said request comprises a request for access to said (i)th directory, requesting said second encryption key from a requester;
operative if said requestor provides said second encryption key, granting access to said (i)th directory.

8. The method of claim 7, wherein said request is received by said intermediate storage assembly, wherein said requesting steps and said granting steps are performed by said intermediate storage assembly.

9. The method of claim 7, wherein said request is received by said data storage library, wherein said requesting steps and said granting steps are performed by said intermediate storage assembly.

10. The method of claim 2, further comprising:
configuring (N) logical units ("LUNs") in said first data storage medium;
prior to said encrypting steps, encoding an (i)th file aggregate and an (i)th directory in an (i)th LUN, wherein (i) is greater than or equal to 1 and less than or equal to (N).

11. An apparatus of an intermediate storage assembly in communication with a host computer and comprising a storage controller and a non-transitory computer readable medium comprising computer readable program code disposed therein to manage file aggregates and file directories, the computer readable program code comprising a series of computer readable program steps to effect:
receiving a plurality of data files from said host computer;
forming (N) file aggregates, wherein each file aggregate comprises one or more of said plurality of data files, and wherein (N) is greater than or equal to 2;
forming (N) directories, wherein each directory is associated with a different one of said (N) file aggregates;

encrypting said (N) file aggregates using a first encryption key;

encrypting said (N) directories using a second encryption key, wherein said first encryption key differs from said second encryption key;

encoding said (N) encrypted file aggregates and said (N) directories in a first data storage medium.

12. The intermediate storage assembly of claim 11, wherein said first data storage medium comprises a holographic data storage medium.

13. The intermediate storage assembly of claim 12, said computer readable program code further comprising a series of computer readable program steps to effect:

configuring (N) logical units ("LUNs") in said first data storage medium;

prior to said encrypting, encoding an (i)th file aggregate and an (i)th directory in an (i)th LUN, wherein (i) is greater than or equal to 1 and less than or equal to (N).

14. The intermediate storage assembly of claim 13, further comprising:

prior to said encrypting steps, destaging, to a data storage library comprising a second data storage medium and in communication with said by said storage controller, an (i)th file aggregate and an (i)th directory.

15. The intermediate storage assembly of claim 14, wherein said second data storage medium comprises a holographic data storage medium.

16. The intermediate storage assembly of claim 15, said computer readable program code further comprising a series of computer readable program steps to effect:

receiving a request for access;

operative if said request comprises a request for access to said (i)th file aggregate, requesting said first encryption key from a requestor;

operative if said requestor provides said first encryption key, granting access to said (i)th file aggregate;

operative if said request comprises a request for access to said (i)th directory, requesting said second encryption key from a requester;

operative if said requestor provides said second encryption key, granting access to said (i)th directory.

17. An apparatus of a data storage library in communication with an intermediate storage assembly comprising a storage controller, said data storage library comprising a non-transitory computer readable medium comprising computer readable program code disposed therein to manage file aggregates and file directories, the computer readable program code comprising a series of computer readable program steps to effect:

receiving from said intermediate storage assembly a file aggregate and a directory;

wherein said file aggregate comprising a portion of a plurality of data files received by said intermediate data storage assembly from an interconnected host computer; and encrypting said file aggregate using a first encryption key;

encrypting said directory using a second encryption key, wherein said first encryption key differs from said second encryption key; and encoding said encrypted file aggregated and said directory in a first data storage medium.

18. The data storage library of claim 17, wherein said computer readable medium comprises a holographic data storage medium.

19. The data storage of claim 17, said computer readable program code further comprising a series of computer readable program steps to effect:

receiving a request for access;

operative if said request comprises a request for access to said (i)th file aggregate, requesting said first encryption key from a requestor;

operative if said requestor provides said first encryption key, granting access to said file aggregate;

operative if said request comprises a request for access to said (i)th directory, requesting said second encryption key from a requestor;

operative if said requestor provides said second encryption key, granting access to said directory.

* * * * *